United States Patent
Smith et al.

(10) Patent No.: US 6,897,448 B2
(45) Date of Patent: May 24, 2005

(54) RADIATION DETECTOR

(75) Inventors: Philip L. Smith, Gloucester Point, VA (US); Karl F. Smith, Rockville, VA (US)

(73) Assignee: Kno-Rad, Inc., Rockville, VA (US)

( * ) Notice: Subject to any disclaimer, the term of this patent is extended or adjusted under 35 U.S.C. 154(b) by 158 days.

(21) Appl. No.: 10/231,734

(22) Filed: Aug. 29, 2002

(65) Prior Publication Data

US 2005/0006587 A1 Jan. 13, 2005

(51) Int. Cl.[7] .................................................. G01T 1/10
(52) U.S. Cl. ........................ 250/367; 250/367; 313/525
(58) Field of Search .............................. 250/367, 361 R, 250/336.1, 336.2; 313/525, 524, 523, 537, 110

(56) References Cited

U.S. PATENT DOCUMENTS

| | | | | |
|---|---|---|---|---|
| 3,944,835 A | * | 3/1976 | Vosburgh | 250/487.1 |
| 4,243,885 A | | 1/1981 | Agouridis et al. | |
| 4,642,463 A | | 2/1987 | Thoms | |
| 4,857,739 A | | 8/1989 | Phelps | |
| 4,963,747 A | | 10/1990 | Thacker | |
| 5,023,456 A | | 6/1991 | Claussen | |
| 5,045,700 A | * | 9/1991 | Crowson et al. | 250/336.1 |
| 5,059,801 A | | 10/1991 | Burgess | |
| 5,065,028 A | | 11/1991 | Cranston et al. | |
| 5,231,288 A | * | 7/1993 | Odell | 250/336.1 |
| 5,241,180 A | * | 8/1993 | Ishaque et al. | 250/361 R |
| 5,591,553 A | * | 1/1997 | Snelling | 430/46 |
| 5,627,377 A | | 5/1997 | Hamilton, Jr. et al. | |
| 6,072,181 A | | 6/2000 | Hassard et al. | |
| 6,155,699 A | * | 12/2000 | Miller et al. | 362/293 |
| 6,388,250 B1 | * | 5/2002 | Croydon et al. | 250/252.1 |
| 2002/0079439 A1 | * | 6/2002 | Croydon et al. | 250/252.1 |

FOREIGN PATENT DOCUMENTS

CA    1078974 A   *   6/1980   ............. G01T/1/16

* cited by examiner

Primary Examiner—Constantine Hannaher
Assistant Examiner—Christine Sung
(74) Attorney, Agent, or Firm—John H. Thomas, P.C.

(57) ABSTRACT

A radiation detector includes a new and sensitive radiation sensor. The sensor includes a photo conductor cell. A substantially transparent cone optically coupled to the photo conductor cell, and a first layer of phosphor material coated onto the transparent cone. The layer of metal is then coated onto the phosphor material. This combination provides a sensitive and compact sensor construction. A bias light is further included to improve the sensitivity of the sensor. Signals sent by the sensor and evaluated by a microprocessor result in the transmission of predetermined audible sounds.

14 Claims, 6 Drawing Sheets

RADIATION DETECTOR

This invention relates to radiation detectors. Specifically, the invention defines an ionizing radiation detector having a ratemeter and alarm that signals the amount of harmful radiation a person may be subject to at any given time.

BACKGROUND OF THE INVENTION

There are many types of radiation measurement devices that are commercially available. These units include very expensive and bulky devices having high energy consumption. There are also sophisticated types of units that may require a detailed knowledge of science and physics in order to interpret or otherwise gather information from.

One family of detectors is commonly referred to as scintillation detectors. These instruments include a photo-detector viewing a radioluminescent (phosphor) material. Particles indicative of harmful radiation strike and excite the phosphor. The resulting light signal is then picked up by the photodetector. A traditional scintillation detector is efficient when a large surface area of photocell is able to be covered with phosphor material. It is impractical to use these existing radiation detectors as convenient personal detection devices, because if the detector is made small enough for personal use, then there is not enough sensitivity to detect low, but still potentially harmful, levels of radiation.

SUMMARY OF THE INVENTION

Accordingly, it is the object of the present invention to overcome the foregoing shortcomings and provide a compact radiation ratemeter having reasonable sensitivity and a substantial life. Further, the radiation detector of the present invention is adapted to transmit different signals indicating the relative amounts of radiation that a person is subject to.

In one embodiment, the invention is a sensor for a radiation detector comprising a photoconductive cell and a substantially transparent cone optically coupled to the photoconductive cell. A layer of phosphor material is coated onto the transparent cone, and a layer of metal is then coated onto the phosphor material. The sensor may further comprise a second layer of phosphor material coated onto the first layer of phosphor material and inside the layer of metal, wherein the second layer of phosphor material contains a different concentration of phosphor crystal than the first layer. The photoconductive cell may be a cadmium sulfide photoresistive cell. The sensor may further comprise a bias light connected to an energy source, whereby the bias light may be activated to test and/or maintain the sensitivity of the photoconductive cell. The metal used on the sensor may be selected from the group of lead or lead alloy. Further, the sensor may be adapted to detect 100 mR/hr of radiation from a Cs137 source.

In an alternative embodiment, the invention is a radiation detector comprising a sensor. The sensor comprises a photoconductive cell, a substantially transparent cone optically coupled to the photoconductive cell, a first layer of phosphor material coated onto the transparent cone and a layer of metal coated onto the phosphor material. The detector further comprises a microprocessor electrically connected to the sensor and adapted to quantify the resistivity of the photoconductive cell. A speaker is also connected to the microprocessor, and a battery is electrically connected to the sensor, microprocessor and speaker. The radiation detector may also include a sensor further comprising a second layer of phosphor material coated onto the first layer of phosphor material and inside the layer of metal, wherein the second layer of phosphor material contains a different concentration of phosphor crystals than the first layer. The photoconductive cell may be a cadmium sulfide photoresistive cell. The sensor may further comprise a bias light connected to an energy source, whereby the bias light might be activated to test and/or maintain the sensitivity of the photoconductive cell. The metal used on the sensor may be selected from the group of lead or lead alloy.

Still further, the invention includes a method of detecting radiation comprising providing a radiation detector comprising a sensor, microprocessor, speaker and battery as earlier described herein. Next, the method includes measuring the amount of detected radiation. The next step includes, if the amount of detected radiation is below a predetermined amount, empowering the speaker to make a predetermined audible sound. The method may further include for a plurality of different amounts of radiation detected, transmitting a predetermined and different audible sounds that corresponds to each respective different amount of radiation detected.

In a still further embodiment, the invention includes a method of detecting radiation comprising providing any radiation detector, measuring the amount of detected radiation, and if the amount of detected radiation is below a predetermined amount, then powering a speaker to make a predetermined audible sound.

DETAILED DESCRIPTION OF THE INVENTION

Figure 1:
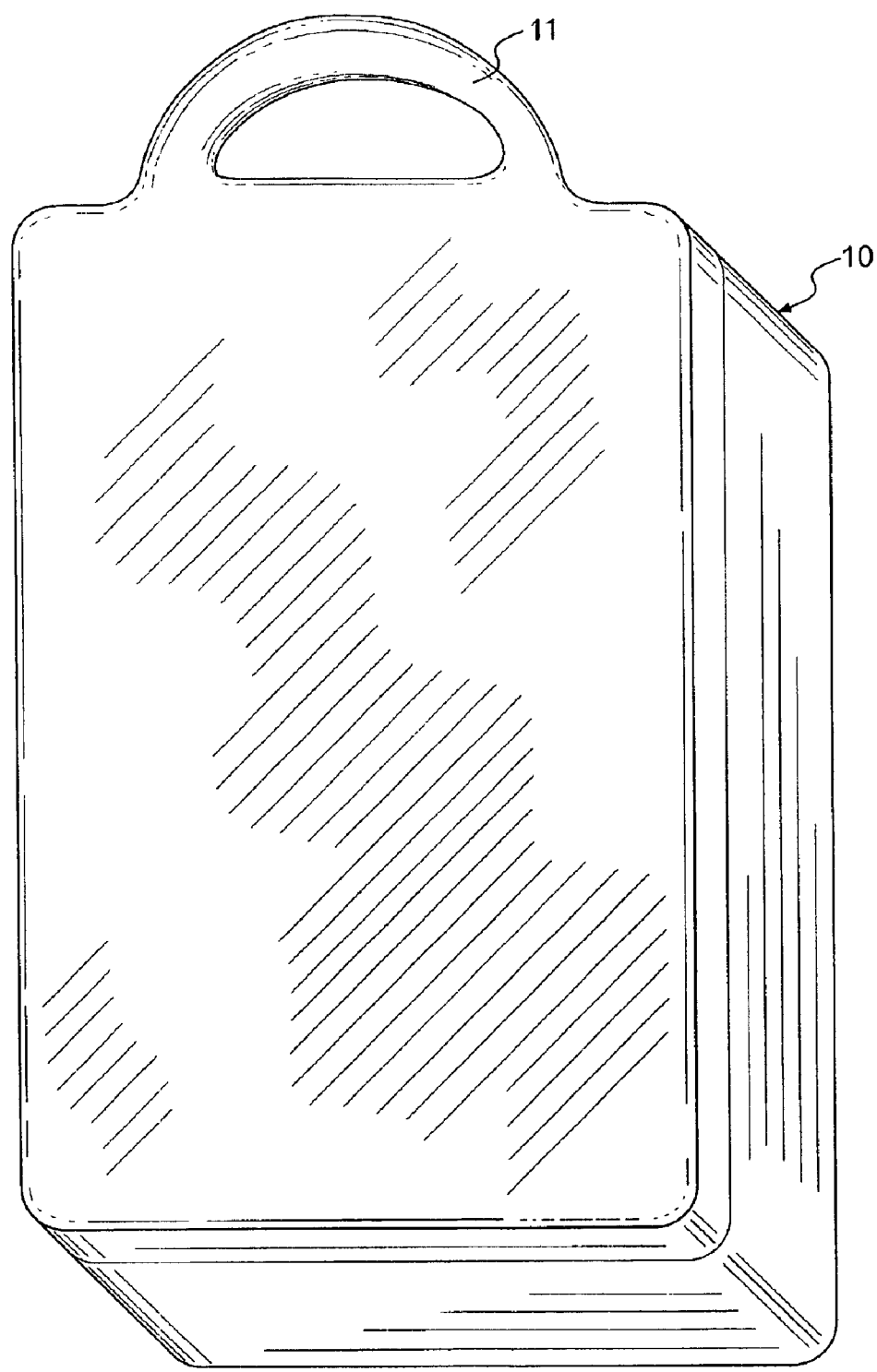
FIG. 1 is a perspective view of a preferred embodiment of a radiation detector.

In its most basic terms, the present invention is a radiation detector having a unique sensor that is connected to and driven by a customized microprocessor. The sensor is an ionizing radiation type detector, consisting of a transparent cone with a phosphor material and metal coating optically coupled to a photoconductive cell. The sensor is maintained in an alert state through use of a bias light that is controlled by the microprocessor. The readings received by the sensor are processed by the microprocessor and, when appropriate, the microprocessor transmits signals regarding the amount of radiation that is being detected to activate an alarm speaker. The multiple components of the detector together with an operational example of the microprocessor are discussed in more detail herein.

The sensing mechanism of the present invention is a photoconductive cell or photodiode that is optically coupled to a radioluminescent (phosphor) material. Cadmium sulfide photoresistive cells are used in a preferred embodiment, although other types of photoconductive cells or photodiodes such as silicone photodiodes can also be used. Functionally, the photoconductive cell (photocell) must have a low resistance in the presence of a feeble light source and an extremely high resistence (approximately 1000 Mohm) in total darkness. The Silonex NSL5512 CdS cell or the Hammamatsu 722-7R cell are both effective sensor components. Additionally, the sensitivity of the photocell should be a good corresponding spectral match to the chosen phosphor material that is also a part of the sensor. Since the specific photocells referenced have their peak spectral sensitivity around 550 nm, they are well matched spectrally with a phosphor such as gadolinium oxysulfide doped with terbium ($Gd_2O_2S$:Tb) or cesium iodide doped with thallium (CsI:Tl) which each have light emissions in the same 550 nm range.

Because the cadmium sulfide portion of the sensor is easily damaged, a precoat layer of acrylic is applied to the face of the sensor to protect it. Many sensors are manufactured and sold with a protective layer already in place. Accordingly, the necessity of this layer will depend on the manufacturer of the sensor and the final processing conditions the sensor is subject to. In a preferred embodiment, a layer of up to one millimeter thickness of acrylated polyurethane (Epoxies, Inc. DP 7160) is coated on the sensor face.

In order for the sensor to detect low levels of potentially harmful radiation, there must be a substantial amount of phosphor available to be excited so that a detectable amount of light will be emitted. For instance, it has been determined that as much as one gram of phosphor crystals is required to provide sufficient light to a photocell in order to detect radiation levels as low as 100 mR/hr sensitivity. If such a quantity of phosphor is simply positioned directly onto or in front of a photocell, the density of the phosphor will obstruct much of its own light when excited. Instead, the present sensor attaches a transparent cone onto the face of the photocell. The subsequent layers of phosphor material that are coated onto the transparent cone are able to then transmit that light directly to the photocell through the transparent cone. The shape of the transparent cone may be conical, elliptical, hemispherical, or any other shape that causes light generated by excited phosphor to be directed by reflections towards the photocell face where it may be detected. From a relative standpoint, it is important that the transparent cone have a greater surface area than the surface area of the photocell in order to present enough surface area that may be available to receive the light from excited phosphor. (The "surface area of the photocell" is the area of the top or face of the photocell). Still more preferably, the surface area should exceed three times the surface area of the photocell. The transparent material that constitutes the cone is not necessarily 100% transparent. Instead, the transparency should be approximately at least seventy percent. Plastic or glass materials may make up the transparent cone. In a preferred embodiment, the plastic used is acrylated polyurethane (Epoxies, Inc., DP 7160). The transparency of this material is 80–93%.

As noted early, as much as one gram of phosphor may be required to provide sufficient sensitivity for the specifically referenced photocells to be able to detect the radiation level of 100 mR/hr sensitivity. This phosphor material may be embedded or mixed into a wide variety of plastic materials that may then be cast or molded or painted onto the outside of the transparent cone. The type, crystal size and relative proportions of phosphor material to the plastic medium determines the translucence or opaqueness of a given phosphor layer. In a preferred embodiment, the phosphor material is coated onto the transparent cone in two layers. There is a translucent inner layer that is coated first onto the transparent cone. A second phosphor material layer is then coated onto the first layer. The second layer containing phosphor material is substantially opaque. In other words, it is a more concentrated phosphor containing layer. Like the first layer, it is embedded in or mixed with a plastic material.

In an operational embodiment, 25 micron crystal size $Gd_2O_2S$:Tb is the phosphor material incorporated in the inner translucent layer at a concentration of about 0.33 g of phosphor per about 0.13 cc of acrylic polyurethane. Ten micron crystal size $Gd_2O_2S$:Tb is used in the outer opaque, white reflective layer at a concentration of about 0.33 g of phosphor material per 0.1 cc of acrylic polyurethane. In each layer, the phosphor crystals are suspended in an ultraviolet curable, acrylic polyurethane (Epoxies, Inc., DP 7160). The inner layer of matrix concentration is chosen for about 50% or better (more clear) translucency, while the outer layer is mixed to achieve nearly 100% reflectivity (opaque).

A metal coating is subsequently applied to the outside of the phosphor layer or layers. Lead or other heavy metal or alloys thereof are preferably fixed over and around the phosphor surface. Still further preferably, the metal or alloy should have a specific gravity of about four or greater. Lead atoms, for instance, have the ability to interact with high energy photons that are indicative of potentially harmful radiation. When struck by a gamma particle, lead emits a shower of electrons that can then enter the phosphor material and produce light that is detected by the photocell. These secondary electrons emitted by the lead or heavy metal material have very little penetrating power, so the metal layer should be in direct contact with the phosphor surface. The lead or other heavy metal or similar alloy can also be an effective reflector to redirect light from the phosphor towards the face of the photocell. The lead coating further acts as a filter to inhibit sensitivity to very low energy radiation. In a preferred embodiment, a layer of lead foil tape 0.006 inches thick is applied to the outer phosphor material.

In total darkness, the electrons within the conduction band in a cadmium sulfide photocell will in time find stable resting places and no longer contribute to conductivity. This causes a large hysteresis to develop that subsequently requires exposure for a very long time in order to respond to a feeble light source.

In order to overcome this hysteresis that might otherwise reduce the sensitivity of the sensor, a bias light is incorporated in the sensor structure. By applying an occasional, brief flash or a very dim continuous light from a light emitting diode, the photocell is kept near a threshold of response and the potential hysteresis problem is minimized. The bias light may be applied from any direction that would allow the light to reach the cadmium sulfide of the photocell. In a preferred embodiment, the bias light is mounted behind the photocell. The cadmium sulfide is fixed on the face of a ceramic substrate, so the light from the bias light is able to show through and be picked up by the photocell. One acceptable type of bias light is a Ti green LED. The bias light is activated by a microprocessor that causes the bias light to emit a brief (about 100 microsecond) flash when the photocell exceeds a preset resistance in the 100–1000 mega ohm range. As noted earlier, the bias light may also be programmed to emit a continuous feeble light instead of a flash or series of flashes.

A microprocessor is connected to the sensor to monitor the resistivity of the sensor and, therefore, the amount of radiation, if any, that is being detected. A specific example of the operation of the microprocessor will be discussed in more detail later herein. As a general matter, a predetermined minimum threshold of resistivity (corresponding to a predetermined minimum threshold of radiation detected) is programmed into the microprocessor. In the event that an amount of radiation above the threshold level is detected, the microprocessor is programmed to respond to the different levels of resistivity of the sensor and the corresponding amounts of radiation that are being detected.

The microprocessor is also connected to an alarm. The alarm is a speaker that will make audible sounds to let a user know whether there is any radiation being detector or whether the detector is in ordinary operating condition. In other words, when the sensor is not detecting any harmful amount of radiation, above a predetermined threshold level, the microprocessor still sends instructions to the alarm to make a predetermined audible sound to advise the user that the detector is still working. Then, once radiation is detected, the relative amount of radiation is determined and a signal is transmitted to the alarm speaker accordingly. Each predetermined level of radiation is assigned a different audible sound over the alarm speaker.

The alarm speaker may be any audible type speaker capable of making a series of different sounds that would then correspond to different operating and detection conditions. In a preferred embodiment, the alarm speaker is a piezoceramic bender disc.

The speaker makes a soft click sound when in the ordinary, no-radiation-detected mode. A series of "chirp" sounds are made when certain levels of radiation are detected. A table of sample alarms and predetermined radiation levels is as follows:

| | | | |
|---|---|---|---|
| 1 chirp | 0.1 to 0.2 | R/hr | 20 sec interval |
| 2 chirps | 0.2 to 0.4 | R/hr | 15 sec interval |
| 3 chirps | 0.4 to 0.8 | R/hr | 10 sec interval |
| 4 chirps | 0.8 to 1.6 | R/hr | 8 sec interval |
| 5 chirps | 1.6 to 3.2 | R/hr | 7 sec interval |
| 6 chirps | 3.2 to 6.4 | R/hr | 6 see interval |
| 7 chirps | 6.4 to 12.8 | R/hr | 5 sec interval |
| 8 chirps | 12.8 to 25.6 | R/hr | 4 sec interval |
| 9 chirps | 25.6 to 51.2 | R/hr | 3 sec interval |
| continuous chirps | over 51.2 | R/hr | |

The detector is powered by a battery that is connected to the photocell, bias light, microprocessor and alarm speaker. In a preferred embodiment, the battery is a 3 volt Panasonic BR2477A lithium coin cell. This is a small battery, yet it has a long life. Of course, other types of batteries could be used and may be developed for use.

All of the components of the detector are mounted within a plastic casing. The casing is a rectangular box shape with a loop so that it may be easily carried around by a user. Also, the casing may be made of essentially any durable material such as metal or composite. It is only necessary that the casing be opaque to prevent any light from entering into the detector and otherwise rendering inoperable the sensor. As noted earlier, the casing is preferably a very small construction so that it is easily carried around. In a preferred embodiment, the dimensions of the casing are 2.1"×1.3"×0.7". The plastic material is ABS.

A specific example of the operation of a preferred embodiment of the radiation detector and component microprocessor will now be discussed. The Microchip PIC12LC508A microprocessor with its associated software program stored in its internal memory is the preferred heart of the ratemeter circuit. The microprocessor signals its information to the user by applying an alternating voltage to a piezoelectric bender disc through two port pins. A resistor limits the instantaneous current delivered to the disc to avoid overloading the battery. The PIC12LC508A has a sleep mode that allows extremely low battery consumption.

The microprocessor determines the level of radiation detected by the sensor by measuring the resistance of the sensor photocell. The photocell resistance is inversely proportional to the level of sensor radiation exposure. One lead of the photocell is connected to the positive side of the battery. The other photocell lead is connected to a microprocessor port pin and a 470 pF capacitor connected to the circuit ground. The size of the capacitor sets the overall sensitivity of the device. To measure the photocell resistance, the port pin is commanded to be an output and cleared to discharge the capacitor to ground potential for at least 10 microseconds. The port pin is then changed to an input as a software timer is started to measure the time required for the capacitor to charge to the microprocessor input threshold voltage through the photocell resistance. The measured time required to charge the capacitor is inversely proportional to the level of radiation. The accuracy of the measurement is affected by the microprocessor clock frequency accuracy, the sensor construction and photocell tolerance, and the capacitor tolerance. The microprocessor compares the measured capacitor charging time with a lookup table stored in the program memory to determine which if any alarm thresholds have been crossed.

Because the microprocessor consumes significant power in performing the measurement process and would deplete the battery in just a few months, an energy management strategy has been devised based around the microprocessor's power conserving sleep mode. When in the measurement mode, the photocell port pin is commanded to be an output and set to discharge the capacitor to ground potential. The port pin is then changed to an input and the PIC12LC508A is placed in the sleep mode, consuming almost no power for 0.2 seconds. At the end of the 0.2 second sleep interval the microprocessor watchdog timer awakens the processor with a reset.

If upon awakening the port pin has charged past the input threshold voltage in a single sleep period, the software will perform a more accurately timed measurement of the charging interval to determine if an alarm threshold has been crossed. If upon awakening the input threshold has not been crossed, the microprocessor will initiate another 0.2 second sleep interval. If after two sleep intervals the input threshold has not been crossed the processor will blink the bias Light Emitting Diode (LED) in the sensor for 100 microseconds and initiate another sleep interval. A resistor limits the current delivered to the LED to avoid overloading the battery. With each additional sleep interval that the capacitor has not charged to the input threshold voltage, the bias LED flash duration is doubled. When the capacitor is finally charged to the threshold voltage, the capacitor is discharged and the process repeated. The light from the LED caused a decrease in the resistance of the sensor photocell, establishing a feedback loop that maintains the photocell at a resistance near the first alarm threshold. Every time the capacitor is discharged the microprocessor is programmed to generate a faint tick on the alarm speaker. This tick occurring several times per second assures the user that the device is properly biased and functioning normally.

When the capacitor charges above the threshold voltage within a single 0.2 second sleep interval the unit switches to the alarm mode. In the alarm mode a sampling delay period is established after which measurements are repeated. As the measured radiation increases, the delay period is shortened from about 20 seconds between measurements at the single chirp alarm level to about 3 seconds delay between measurements at the nine chirp alarm level. This helps conserve battery power while alarming. When the lowest radiation intensity alarm threshold (100 mR/hr) has been exceeded, the processor generates a single chirp tone on the alarm sounder after every sampling delay period. For every doubling of the radiation intensity above that threshold, an additional chirp tone is added to the alarm sequence that is repeated after each sampling delay period. Thus the device can alert the user to the relative degree of radiation hazard over a wide range of radiation intensities. When the highest alarm range (nine chirps=25 R/hr to 50 R/hr) is exceeded, the unit enters a continuous siren like chirping over range mode. In this over range mode, further increases in radiation intensity result in faster and faster continuous chirping suggesting that the user should be moving faster and faster to escape the radiation hazard.

Reference is now made to the drawings that illustrate a commercial embodiment of the present invention. FIG. 1 is a perspective view of a plastic casing 10 that will carry and protect the detector in accordance with the present invention. As discussed earlier, the detector casing 10 is small enough and includes a loop 11 which makes is conveniently attachable to a key chain, for instance.

Figure 2:
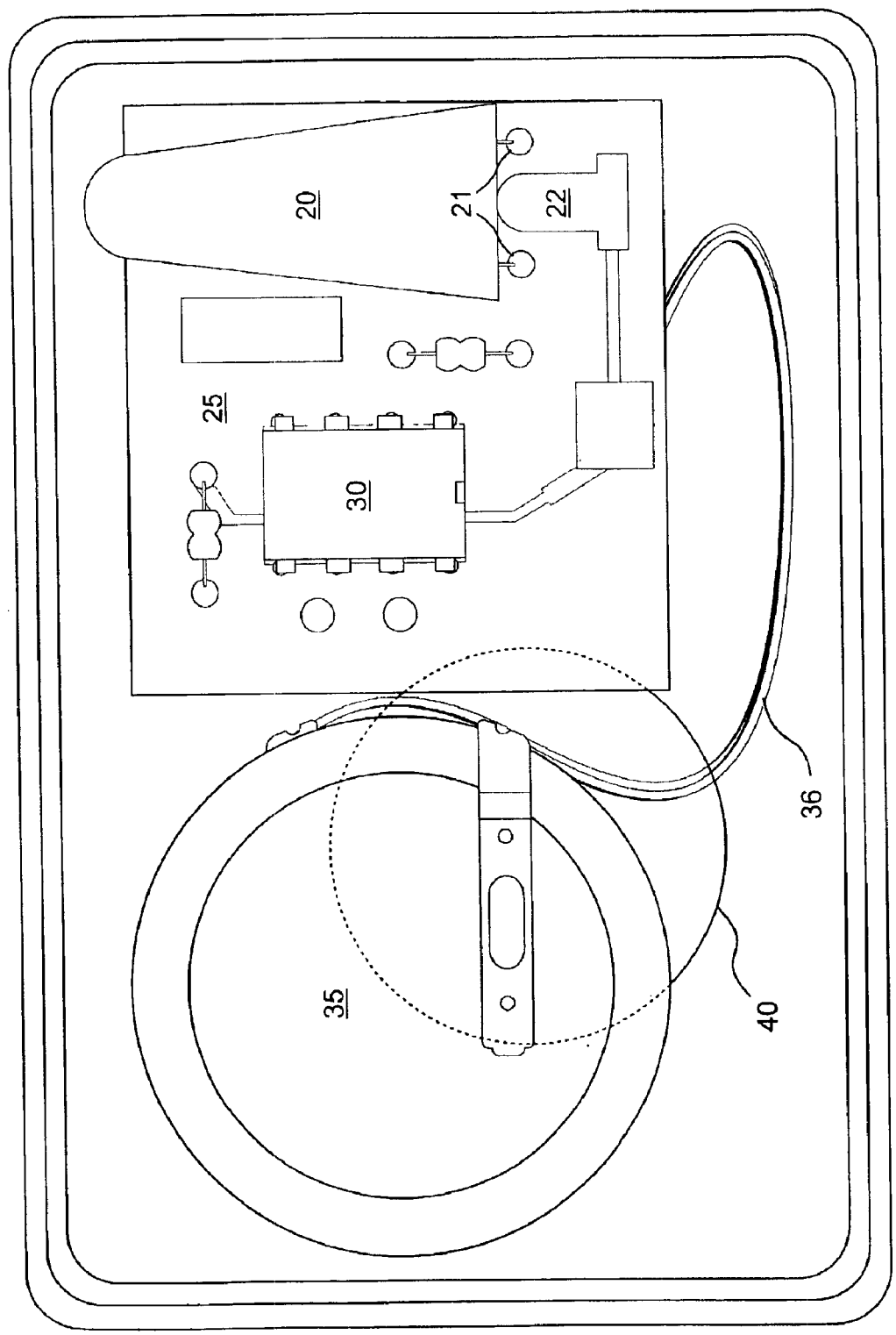
FIG. 2 is a top plan view of a preferred radiation detector with the top cover portion of the detector removed.

FIG. 2 is a top view of the detector 10 with the top portion removed. Looking down into the detector 10, there can be seen the sensor 20. The sensor 20 is electrically connected via leads 21 to a circuit board 25. Also on the board 25 is a microprocessor 30 and a bias light 22. Battery 35 is connected by wire 36 to the circuit board 35 and speaker 40. Mounted underneath or behind battery 35 is the speaker 40. Each of these components is discussed in detail earlier herein. Each of the components is fixed inside the casing 10 that is permanently sealed to keep out light and moisture.

FIGS. 3A–3F illustrate the various intermediate components of the sensor as it is being manufactured. The photocell 50 is made up of the sensor face 52 and ceramic substrate 51. Electrical prongs 21 are used to connect the sensor to the rest of the device.

Figure 3A:
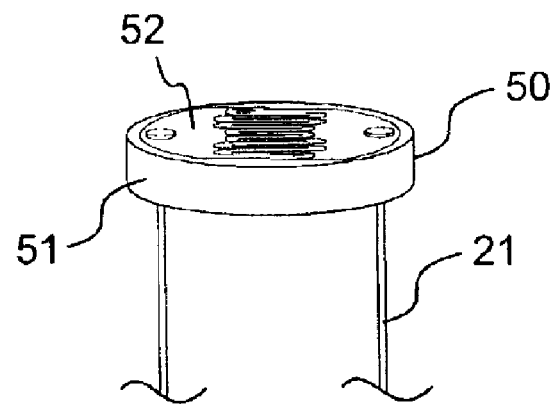
FIGS. 3A–3F are a series of perspective views of the various intermediate stages of the manufacture of a sensor for a radiation detector.
Figure 3B:
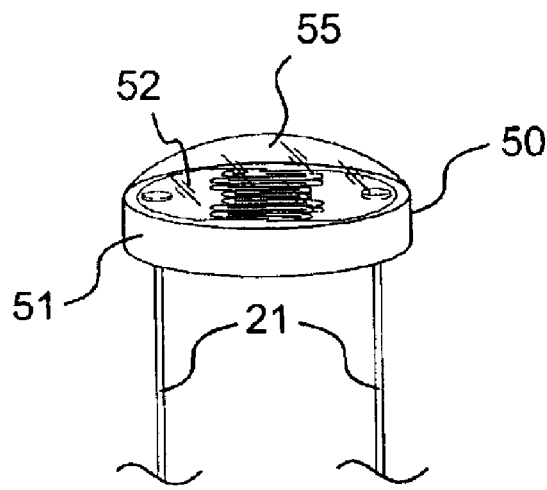

FIG. 3B demonstrate the precoat 55 of acrylic material that is added onto the face 52 of the sensor 50 in order to protect and preserve the cadmium sulfide face of the photocell in a preferred embodiment.

Figure 3C:
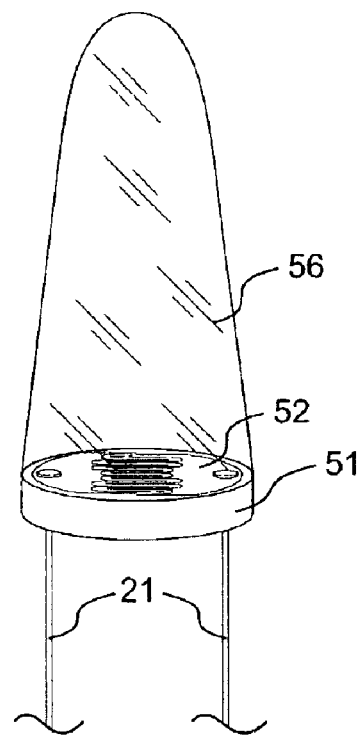
Figure 3D:
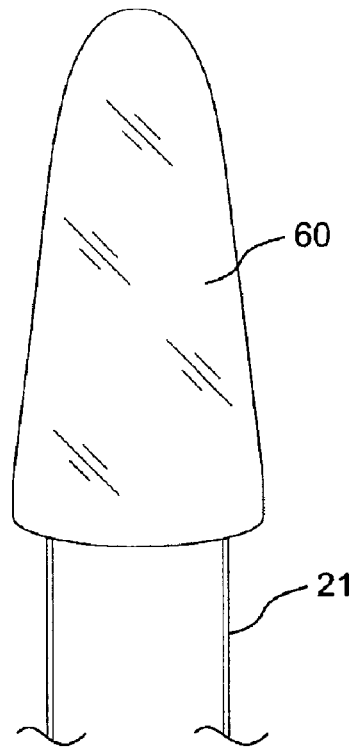
Figure 3E:
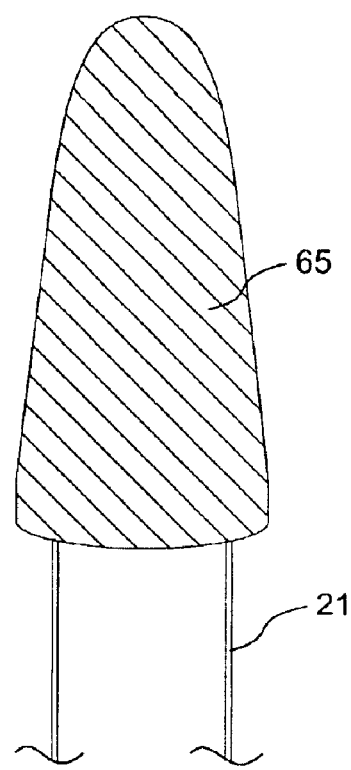
Figure 3F:
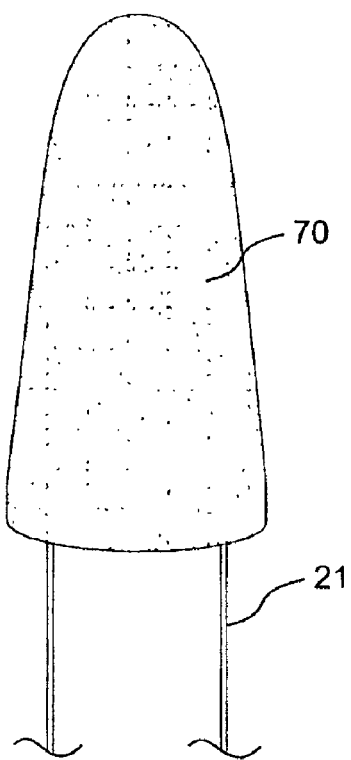

FIG. 3C illustrates the transparent cone 56 that is optically coupled to the face 52 of the photocell 50. During manufacture, the acrylic epoxy that makes up the transparent cone 56 is placed in liquid form into a microcentrifuge test tube (Model S1012, Robins Scientific Corp. or Capless Microcentrifuge Tube (1.7 ml) Model 20-X, Island Scientific). The face of the sensor 50 is then placed on top of the acrylic epoxy that makes up the transparent cone 56. Once subjected to UV light, the epoxy is cured and the sensor 50 is secured to the transparent cone 56.

Next, the first layer of phosphor containing matrix 60 is applied to the outside of the transparent cone 56. During manufacture, the sensor with the transparent cone is removed from the test tube, the uncured liquid form of the phosphor containing matrix is placed into the bottom of the test tube, and the transparent cone is then inserted back into the test tube so that the phosphor-containing material will coat around its exterior. After UV curing of the first layer 60, This process is repeated for the second layer of phosphor material 65 that is subsequently coated onto the first layer. Once the phosphor containing layers 60 and 65 are coated onto the transparent cone 56, the sensor is then covered with lead tape 70.

Figure 4:
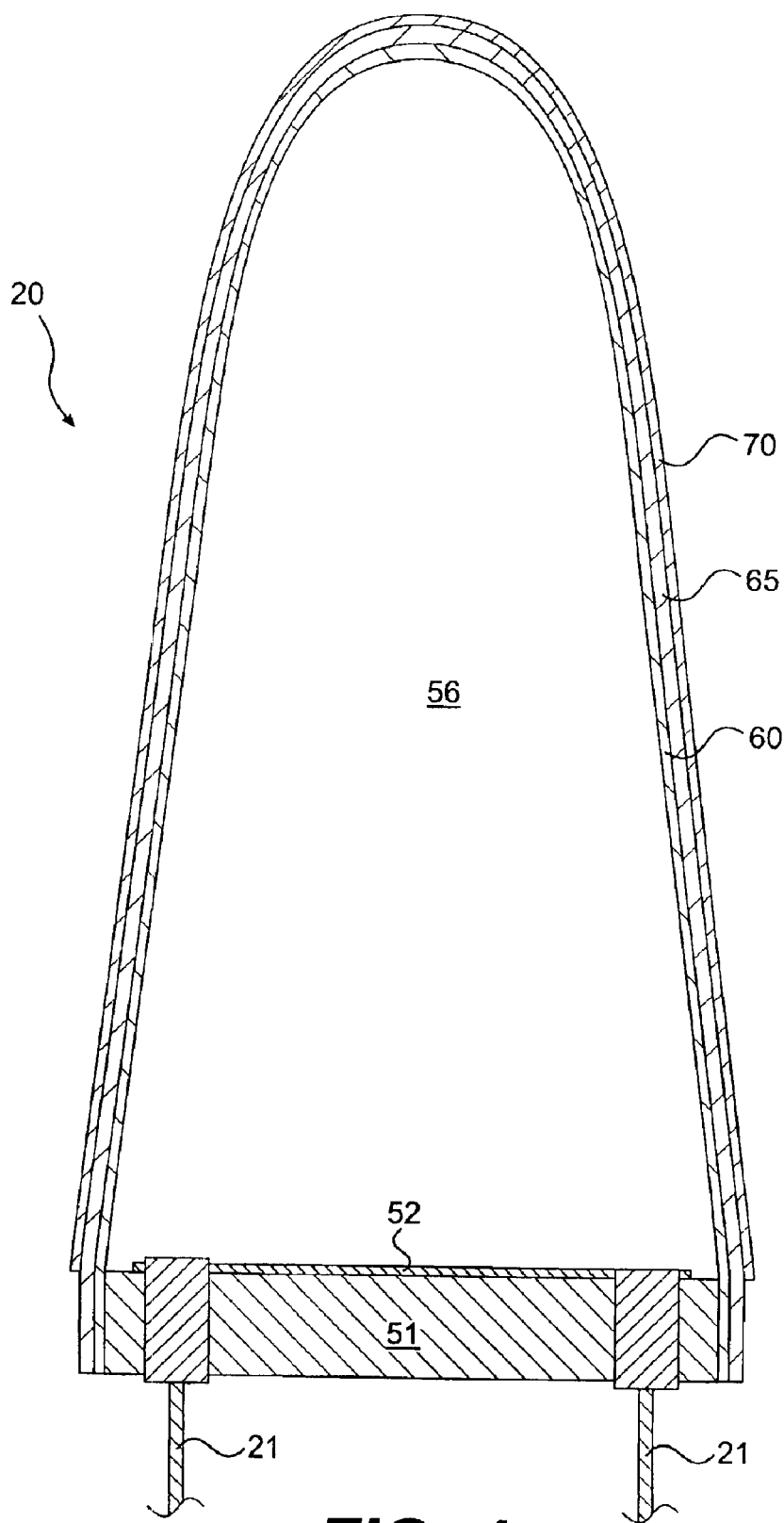
FIG. 4 is a side elevation, cross sectional view of the sensor shown in FIGS. 3A–3F.

FIG. 4 is a side, cross sectional view of the sensor 20 that shows the ceramic substrate 51 and face 52 of the sensor mechanism 50. The transparent cone 56 is coated with the first and second layers of phosphor containing matrix 60 and 65 and then the metal layer (lead tape) 70.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. A sensor for a radiation detector comprising:
   a photoconductive cell,
   a substantially transparent cone optically coupled to the photoconductive cell,
   a first layer of phosphor material coated onto the transparent cone, and
   a layer of metal coated onto the phosphor material.

2. A sensor as described in claim 1, further comprising a second layer of phosphor material coated onto the first layer of phosphor material and inside the layer of metal,
   wherein the second layer of phosphor material contains a different concentration of phosphor crystals than the first layer.

3. A sensor as described in claim 1, wherein the photoconductive cell is a cadmium sulfide photoresistive cell.

4. A sensor as described in claim 1, further comprising a bias light connected to an energy source, whereby the bias light may be activated to test and/or maintain the sensitivity of the photoconductive cell.

5. A sensor as described in claim 1, wherein the metal used is selected from the group of lead or lead alloy.

6. A sensor as described in claim 1, wherein the sensor is adapted to detect 100 mR/hr of radiation from a Cs137 source.

7. A radiation detector comprising:
   a) a sensor comprising
      a photoconductive cell,
      a substantially transparent cone optically coupled to the photoconductive cell,
      a first layer of phosphor material coated onto the transparent cone, and
      a layer of metal coated onto the phosphor material;
   b) a microprocessor electrically connected to the sensor and adapted to quantify the resistivity of the photoconductive cell;
   c) a speaker connected to the microprocessor; and
   d) a battery electrically connected to the sensor, the microprocessor and the speaker.

8. A radiation detector as described in claim 7, wherein the sensor further comprises a second layer of phosphor material coated onto the first layer of phosphor material and inside the layer of metal,
   wherein the second layer of phosphor material contains a different concentration of phosphor crystals than the first layer.

9. A radiation detector as described in claim 7, wherein the photoconductive cell is a cadmium sulfide photoresistive cell.

10. A radiation detector as described in claim 7, wherein the sensor further comprises a bias light connected to an energy source, whereby the bias light may be activated to test and/or maintain the sensitivity of the photoconductive cell.

11. A radiation detector as described in claim 7, wherein the metal used is selected from the group of lead or lead alloy.

12. A radiation detector as described in claim 7, wherein the sensor is adapted to detect 100 mR/hr of radiation from a Cs137 source.

13. A method of detecting radiation comprising:
a) providing a radiation detector comprising:
a sensor comprising
   a photoconductive cell,
   a substantially transparent cone optically coupled to the photoconductive cell,
   a first layer of phosphor material coated onto the transparent cone, and
   a layer of metal coated onto the phosphor material;
a microprocessor electrically connected to the sensor and adapted to qualify the resistivity of the photoconductive cell;
a speaker connected to the microprocessor;
a battery electrically connected to the sensor, the microprocessor and the speaker;
b) measuring the amount of detected radiation; and
c) if the amount of detected radiation is below a predetermined amount, then powering the speaker to make a predetermined audible sound.

14. A method of detecting radiation as described in claim 13, further comprising:
d) for a plurality of different amounts of radiation detected, transmitting a predetermined and different audible sound that corresponds to each respective different amount of radiation detected.

* * * * *